No. 789,505. PATENTED MAY 9, 1905.
J. PURDIE.
WAVE MOTOR.
APPLICATION FILED DEC. 7, 1903.
3 SHEETS—SHEET 1.
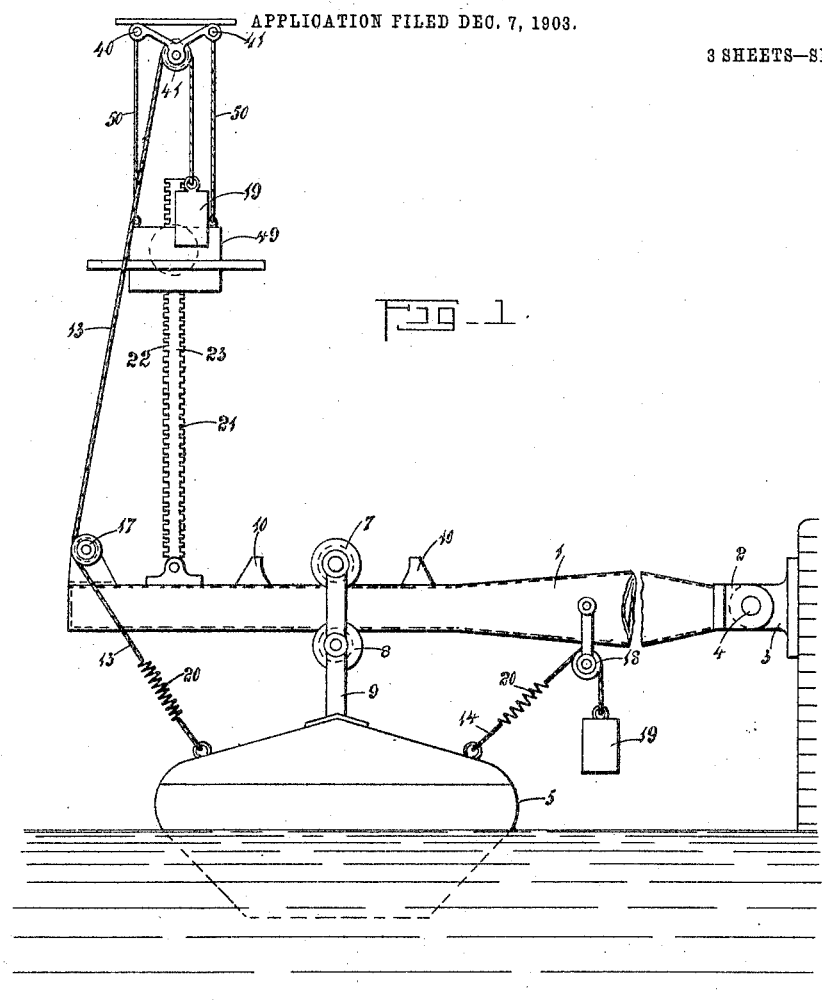
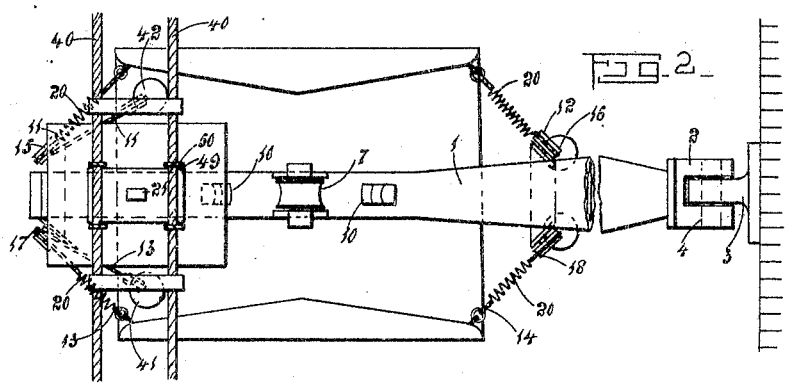
Witnesses.
Inventor
James Purdie
by his Attorney

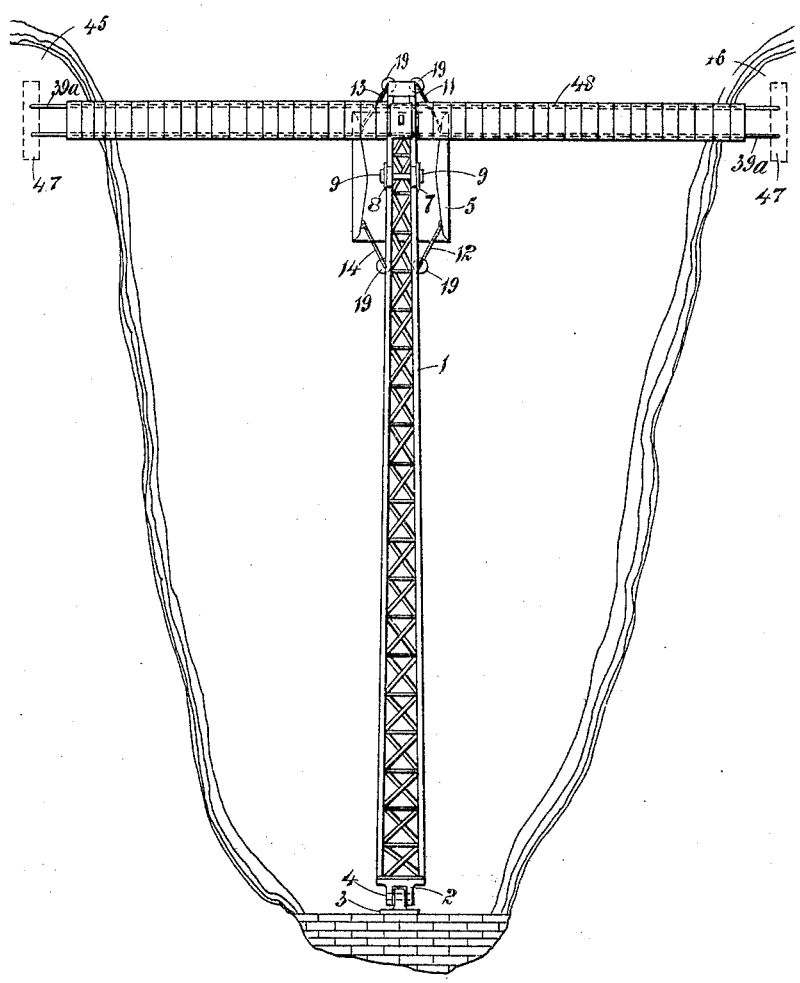

No. 789,505. PATENTED MAY 9, 1905.
J. PURDIE.
WAVE MOTOR.
APPLICATION FILED DEC. 7, 1903.

3 SHEETS—SHEET 3.

Witnesses.
Inventor
James Purdie
By his Attorney
Henrietta Hayward

No. 789,505. Patented May 9, 1905.

UNITED STATES PATENT OFFICE.

JAMES PURDIE, OF DUNEDIN, NEW ZEALAND.

WAVE-MOTOR.

SPECIFICATION forming part of Letters Patent No. 789,505, dated May 9, 1905.

Application filed December 7, 1903. Serial No. 184,226.

*To all whom it may concern:*

Be it known that I, JAMES PURDIE, aerated-water manufacturer, of 21 Great King street, Dunedin, in the Provincial District of Otago, in the Colony of New Zealand, have invented an Improved Wave-Motor, of which the following is a specification.

This invention relates to the utilization of the action of sea-waves for the production of motive power.

In my invention I employ a float which is connected to a boom projecting over the sea. Vertical movement of the float is converted into rotary motion by means of gear which is carried upon suspensory ropes extending transversely over the boom. The boom is pivoted at its inner end, so that it may vibrate as the float rises and falls. The boom is carried upon guide-rollers upon the float, which is provided with spring or other tension gear to allow it to yield in some degree to side action of the waves and normally return to the desired position.

Figure 4:
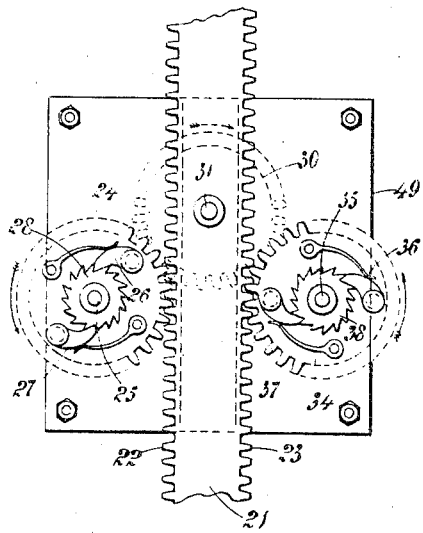
Figure 5:
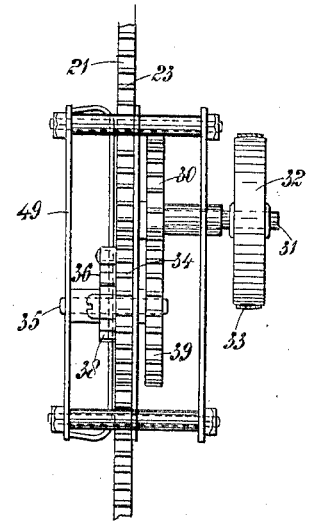
Figure 6:
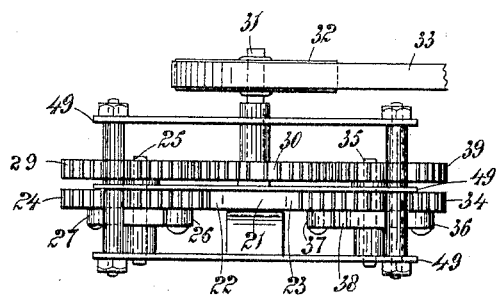

Referring to the drawings, Figure 1 is a side elevation; Fig. 2, a plan. Fig. 3 is a plan. Figs. 4, 5, and 6 are respectively front elevation with the front plate removed, a side elevation, and a plan of the gear employed for converting vertical movement of the float into rotary motion.

The boom 1 is preferably of the tubular type and at its inner end has a jaw 2, pivoted upon an eye 3 by a pivot-pin 4. The float 5 is of metal plate and approximately rectangular in section. It is carried upon the boom by brackets 9, in which are journaled a pair of rollers 7 and 8, one roller running upon and the other beneath the boom. Chocks 10 upon the boom limit the travel of the rollers thereon. The several corners of the float have each a wire rope 11, 12, 13, and 14, severally passing over guide-pulleys 15, 16, 17, and 18 upon the boom. The ropes 11 and 13 also pass over guide-pulleys 41 and 42, which are hung by brackets 43 and 44 upon the suspensory ropes 40, the end of each rope being provided with a balance-weight 19. A tension-spring 20 is also employed in each rope between the guide-pulley and the float. The object of this arrangement is to allow the float to yield to irregular action of the waves and to afterward assume its normal position.

A vertical rack 21, pivotally secured upon and projecting upwardly from the boom, has gear-teeth 22 and 23, the teeth 22 gearing with a pinion 24, revolving loosely upon a spindle 25 and having pawls 26 and 27, engaging with the ratchet-teeth of a wheel 28, fixed upon the spindle 25, which carries a gear-wheel 29, engaging with a wheel 30, fixed upon the spindle 31, which carries a fly-wheel 32, from which power is taken by a belt 33 or otherwise to drive a dynamo or for other purposes. The gear-teeth 23 engage with the teeth of a wheel 34, journaled on the spindle 35 and having pawls 36 and 37, adapted to engage with the ratchet-teeth of a wheel 38, fixed upon the spindle 35, upon which is secured a wheel 39, having teeth engaging with the wheel 30. The mechanism is carried in a box 49, hung by ropes 50 to the suspensory ropes 40. The employment of this mechanism causes vertical movement of the rack to produce rotary motion of the fly-wheel. The mechanism is supported upon ropes 40, extending from the headland 45 to the headland 46 and having their ends fixed to anchors 47 sunk in the ground. Battens 48 are secured transversely upon the ropes 40, as shown in Fig. 3, to form a bridge, whereby access may be had to the mechanism.

Having now particularly described and ascertained the nature of my said invention and in what manner the same is to be performed, I declare that what I claim is—

1. For the purpose indicated in combination, a boom pivoted to a support at one end and sustained by a float near the other end which projects over the sea, brackets upon the float and rollers pivoted in the brackets to support the boom, wire ropes attached to the float, tension-springs in the rope, pulleys upon the boom over which the ropes pass, and balance-weights upon the ends of the ropes, substantially as specified.

2. For the purpose indicated, in combination, a boom pivoted to a support at one end and sustained by a float near the other end which projects over the sea, a rack projecting upwardly from the outer end of the boom-teeth upon both sides of the rack, pinions loose upon their shafts and gearing with the teeth of the rack, pawls pivoted upon the pinions, and gear-wheels fixed to the said shafts, and a gear-wheel fixed to its shaft and engaging with the gear-wheels, and a fly-wheel upon the said shaft, substantially as specified.

3. For the purpose indicated in combination, a boom pivoted to a support at one end and sustained by a float near the other end which projects over the sea, brackets upon the float and rollers pivoted in the brackets to support the boom, wire ropes attached to the float, tension-springs in the rope, pulley upon the boom over which the ropes pass, balance-weights upon the ends of the ropes, a rack projecting upwardly from the outer end of the boom, teeth upon both sides of the rack, pinions loose upon their shafts and gearing with the teeth of the rack, pawls pivoted upon the pinions, and gear-wheels fixed to the said shafts and a gear-wheel fixed to its shaft and engaging with the gear-wheels, and a fly-wheel upon the said shaft, substantially as specified.

JAMES PURDIE.

Witnesses:
   H. W. MARKESACK,
   T. H. THOMPSON.